(12) United States Patent
Henze et al.

(10) Patent No.: US 6,241,834 B1
(45) Date of Patent: Jun. 5, 2001

(54) METHOD FOR PRODUCING A SEAM REINFORCEMENT

(75) Inventors: Siegfried Henze, Hohenroth; Martin Schnaus, Bad Koenigshofen, both of (DE)

(73) Assignee: TEXPA Maschinenbau GmbH & Co. (DE)

(*) Notice: Subject to any disclaimer, the term of this patent is extended or adjusted under 35 U.S.C. 154(b) by 0 days.

(21) Appl. No.: 09/299,045

(22) Filed: Apr. 23, 1999

(30) Foreign Application Priority Data

Apr. 27, 1998 (DE) .............................. 198 18 664

(51) Int. Cl.⁷ .................................................. B32B 31/16
(52) U.S. Cl. .............................................. 156/73.1; 156/93
(58) Field of Search ................... 156/73.1, 73.2, 156/73.4, 91, 92, 93

(56) References Cited

U.S. PATENT DOCUMENTS

| | | | |
|---|---|---|---|
| 4,247,345 | * 1/1981 | Kadija et al. | 156/73.4 |
| 4,256,790 | * 3/1981 | Lackman et al. | 428/73 |
| 4,478,661 | * 10/1984 | Lewis | 156/92 |
| 5,186,776 | * 2/1993 | Boyce et al. | 156/73.2 |
| 5,569,344 | * 10/1996 | Grimnes | 156/90 |
| 5,800,672 | * 9/1998 | Boyce et al. | 156/580.1 |

FOREIGN PATENT DOCUMENTS

| | | |
|---|---|---|
| 27 31 348 A1 | 1/1979 | (DE) . |
| 44 45 384 A1 | 6/1996 | (DE) . |
| 195 17 103 A1 | 11/1999 | (DE) . |
| 08173660 | 7/1996 | (JP) . |

* cited by examiner

Primary Examiner—James Sells
(74) Attorney, Agent, or Firm—McGlew & Tuttle, P.C.

(57) ABSTRACT

A method and also to a device for producing a seam reinforcement in the course of the manufacture of a textile workpiece is provided. The fabric is stitched with at least one thread. In the process at least one of the threads that are used to produce the seam is connected to the fabric in a heat-sealing device, subject to addition of a fusible material.

21 Claims, 1 Drawing Sheet

METHOD FOR PRODUCING A SEAM REINFORCEMENT

FIELD OF THE INVENTION

The invention relates to a method for producing a seam reinforcement in the course of the manufacture of a textile workpiece, the fabric of which is stitched with at least one thread. The invention further relates to a device for implementing the method.

BACKGROUND OF THE INVENTION

In the course of the manufacture of textile workpieces of arbitrary type for example, pillows, tablecloths, terry cloths, terry goods or duvet covers—one or more sections of fabric are stitched to one another in order to obtain the desired shape and structure of the workpiece. Particularly in the case of automatic stitching processes, types of stitch are employed—for example, chain stitch or overcast—that have the disadvantage that they can be unravelled from the end of the seam, as a result of which the seam comes loose.

In order to prevent the seam from coming undone from the end of the seam, seam reinforcements have to be applied at the ends of the seam with these types of stitch. If a special synthetic thread is used for producing the seam, the seam reinforcement can be produced by the synthetic thread being shrunk on, under hot air. If, as in most cases, a synthetic thread is not used, a bar tack has to be stitched at the end of the seam at right angles to the seam in order to obtain a durable seam reinforcement.

One disadvantage of the known method for producing a seam reinforcement is that the stitching of the bar tack, with a view to reinforcing the seam at the end of the seam, constitutes an additional, cost-intensive manufacturing step.

SUMMARY AND OBJECTS OF THE INVENTION

The primary object of the present invention is to propose a method for producing a seam reinforcement that can be carried out quickly, simply and at favorable cost.

According to the invention, at least one of the threads that are used for producing the seam, particularly in the region of the end of the seam, is connected to the fabric of the textile workpiece in a heat-sealing device, subject to addition of a fusible material. As a result of this, the thread that is used is heat-sealed or bonded to the stitched fabric, and the seam can subsequently no longer be unraveled.

By way of heat-sealing devices, in principle all devices are conceivable by means of which sufficient energy, in particular thermal energy, can be supplied to the zones of reinforcement in order to fuse the fusible supplementary material and thereby to connect the thread of the seam to the fabric. According to a preferred embodiment of the invention the heat-sealing device takes the form of an ultrasonic heat-sealing device.

The amount of thermal energy that is necessary in the course of ultrasonic heat-sealing is relatively modest, so that damage to the fabric is ruled out. In addition, the ultrasonic heat-sealing process can be carried out with a high degree of process safety and repetitive accuracy.

It is especially advantageous if the fusible material is supplied in the form of a plastic film. In each heat-sealing operation the plastic film is firstly pressed together in a small region with the thread of the seam and with the fabric and is subsequently fused by the heat-sealing device. In the process the thread is connected to the fabric. After each heat-sealing operation the plastic film has to be conveyed one length further, so that a new section of the plastic film is available by way of fusible material.

The plastic film should preferably be at least slightly wider than the width of the seam to be reinforced. As a result, it is ensured that in the region of reinforcement the seam is connected to the fabric beyond the entire width of the seam. The wider the plastic film in comparison with to the width of the seam, the lesser the positioning effort and the requisite accuracy in connection with the positioning of the heat-sealing device.

With many forms of seam the reinforcement of the seam on one side of the fabric—that is to say, from above or from below—is sufficient. If an especially reliable seam reinforcement is to be produced—particularly if the fabric has been hemmed at the edges with a chain-stitch sewing machine, for example—it is advantageous to connect the thread or threads that are used in the course of production of the seam to the fabric both on the upper side and on the underside of the seam. As a result of this, the surface of the seam reinforcement is doubled without the length of the seam reinforcement having to be increased. In addition it is ensured that, where use is made of a chain stitch, for example, in every case both upper thread and lower thread are connected to the fabric.

Especially suitable by way of fusible materials are thermoplastics, in particular polyethylene, since they can be fused with relatively little thermal energy and they exhibit good adhesion after being fused on textile materials. In addition, polyethylene films are available at favorable cost in a large number of styles and grades.

With a view to carrying out the method according to the invention, a device is proposed which comprises an ultrasonic sonotrode that is capable of being displaced towards a functionally complementary subordinate tool. If the ultrasonic sonotrode is pressed against the subordinate tool, the effective region of an ultrasonic heat-sealing process forms between the two opposite effective surfaces of the ultrasonic sonotrode and of the subordinate tool. A section of fabric with a seam between the ultrasonic sonotrode and the subordinate tool can be introduced into the device by conveyor means within the device. In the process the section of fabric is positioned in such a way that in the region of reinforcement the seam is capable of being brought into a position of contact between the effective surfaces of the ultrasonic sonotrode and of the subordinate tool. A plastic film can be conveyed from a feeding mechanism arranged in the device into the effective region between ultrasonic sonotrode and subordinate tool.

When carrying out the method according to the invention, first of all the section of fabric between the opened heat-sealing tool is positioned in such a way that the end of the seam to be reinforced comes to be situated between ultrasonic sonotrode and subordinate tool. The plastic film is subsequently conveyed from the feeding mechanism into the heat-sealing zone. Alternatively, the film may also be conveyed by the feeding mechanism into the heat-sealing zone as soon as the preceding heat-sealing operation has been concluded. After this, the ultrasonic sonotrode is displaced towards the subordinate tool, as a result of which the section of fabric at the end of the seam is pressed together with the plastic film. Subsequently the ultrasonic sonotrode is put into operation, so that the plastic film fuses and connects the thread of the seam to the fabric. Finally, the heat-sealing tool is opened and the section of fabric is conveyed onward.

The plastic film should preferably be at least slightly wider at right angles to the conveying direction than the ultrasonic sonotrode. By this means it is ensured that by virtue of the heat-sealing operation merely holes are introduced into the plastic film, and the plastic film can be pulled taught on the remaining webs of material and simply drawn onward.

A particularly simple construction of the feeding mechanism arises if the latter comprises two spools that are rotatably supported on the ultrasonic sonotrode and capable of being displaced together with the latter. This means that the support for the two spools and the ultrasonic sonotrode are firmly connected to one another and are displaced as a common assembly. The strip of film that is used by way of supplementary heat-sealing material is stored on the first spool. The second spool can be driven, in order to unwind the strip of film that is wound on the first spool and thereby to bring about the necessary conveying movement of the strip of film. The two spools are connected by the strip of film in such a manner that the latter passes between ultrasonic sonotrode and subordinate tool. As a result, when the strip of film is wound onto the second spool the strip of film is drawn through the effective region of the heat-sealing tool, in order to make a new section of the plastic film available by way of supplementary heat-sealing material in the heat-sealing zone for each heat-sealing operation.

In order to ensure that the heat-sealed region of the end of the seam always has exactly the same size as the effective surface of the ultrasonic sonotrode which is used, after each heat-scaling operation the strip of film should be conveyed onward by one conveying width, which is at least slightly wider than the ultrasonic sonotrode.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
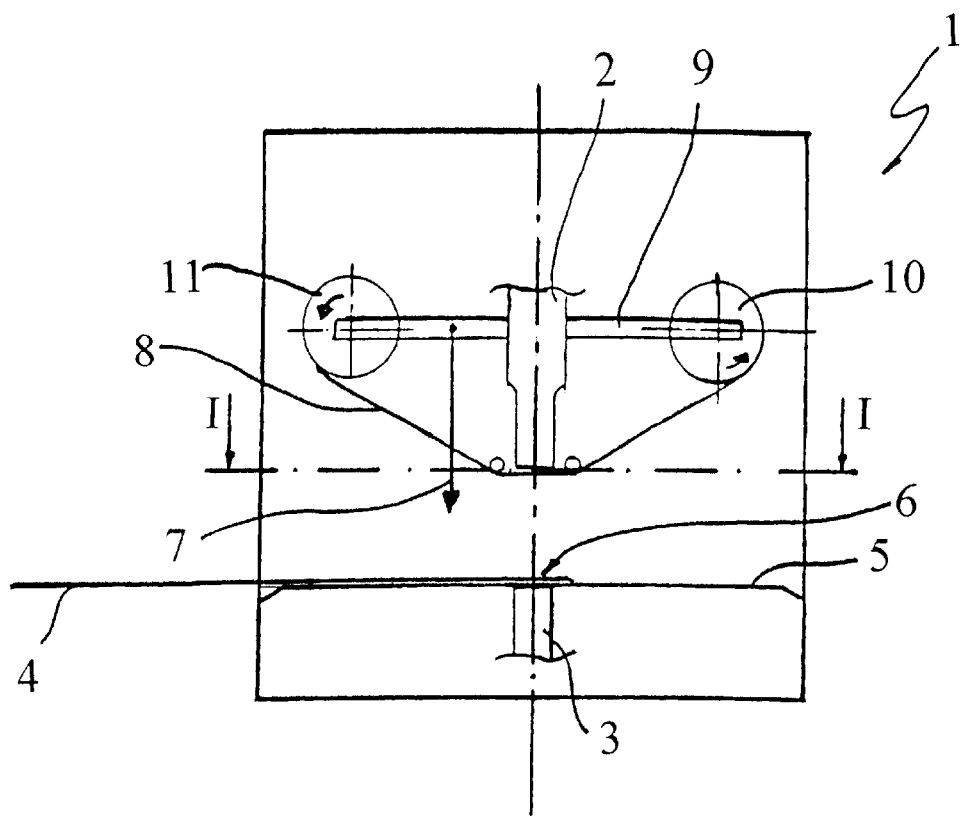
FIG. 1 is a side schematic representation of a device for carrying out the method according to the invention.

Referring to the drawings in particular, FIG. 1 shows a device 1 according to the invention with an ultrasonic sonotrode 2 and with a subordinate tool 3. The subordinate tool 3 is arranged so as to be functionally complementary to the ultrasonic sonotrode 2. A stitched section of fabric 4 is conveyed by means of a conveyor mechanism 5 into the effective region of the device 1, between the ultrasonic sonotrode and the subordinate tool 3. In the process the section of fabric 4 is positioned in such a way that a seam-end 6 comes to be situated above the subordinate tool 3. Of course, the arrangement of the entire device may be reversed, in case this is advantageous for the implementation of the method with certain workpieces, so that the subordinate tool 3 is arranged above the ultrasonic sonotrode 2.

Subsequently the ultrasonic sonotrode 2 is displaced in the downward direction along the arrow of motion 7 until it presses against the subordinate tool 3 with a predetermined pressure. In the process a feeding mechanism 9 is displaced in the downward direction together with the ultrasonic sonotrode 2, so that a strip of film 8 supported on the feeding mechanism 9 is pressed together with the section of fabric 4 in the region between the subordinate tool 3 and the ultrasonic sonotrode 2. After this, the ultrasonic sonotrode 2 is put into operation, as a result of which the strip of film 8 is fused in the region below the ultrasonic sonotrode 2, and the seam-end 6 is thereby attached to the section of fabric 4. Subsequently the ultrasonic sonotrode 2 is displaced back into the initial position and the strip of film 8 is conveyed a length further by the spindle 10 being driven. During the conveying movement the strip of film 8 is unrolled from the spindle 11. Subsequently the next seam-end can be conveyed into the device and heat-sealed.

Figure 2:
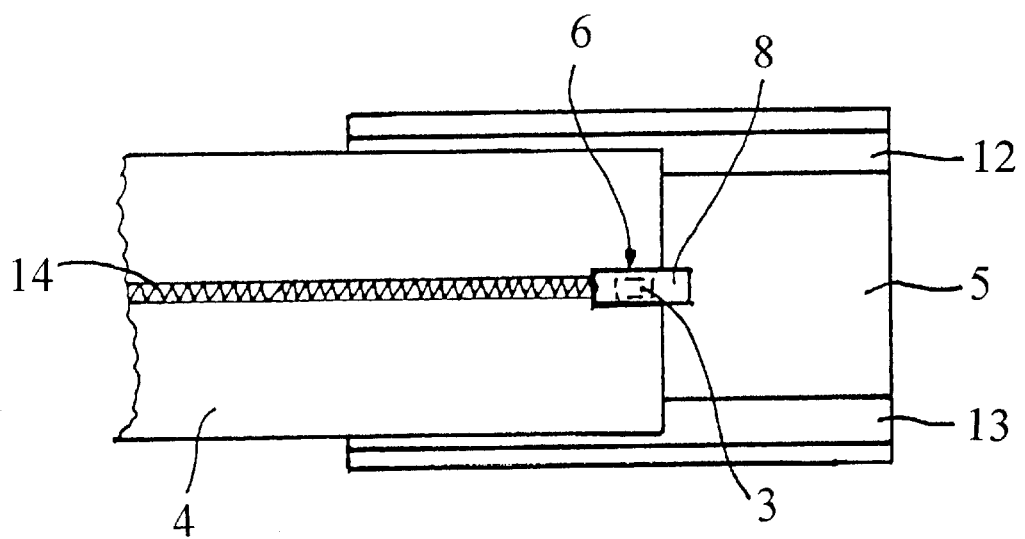
FIG. 2 is a cross-sectional view of the device of FIG. 1, taken along the line of intersection I—I.

FIG. 2 shows the device 1 in section along the line of intersection I—I. The conveyor mechanism 5 can be discerned with two conveyor belts 12 and 13 arranged on either side of the section of fabric 4. The section of fabric 4 is stitched in the middle by means of the seam 14. The seam-end 6 is concealed by the strip of film 8, which is represented in cut form. The subordinate tool 3 is arranged below the seam-end 6. The width of the subordinate tool 3 is slightly wider than the width of the seam 14 at right angles to the conveying direction. The strip of film 8 is somewhat wider than the seam 14, in order to be able to reliably guarantee one hundred percent coverage of the seam 14 with relatively low requirements as regards the positioning accuracy of the feeding mechanism 9.

While a specific embodiment of the invention has been shown and described in detail to illustrate the application of the principles of the invention, it will be understood that the invention may be embodied otherwise without departing from such principles.

What is claimed is:

1. A method for producing a seam reinforcement in the course of the manufacture of a textile workpiece, the fabric of which is stitched with at least one thread, the method comprising the steps of:
    using at least one thread to produce a seam;
    connecting the at least one thread to the fabric with a heat-sealing device and a fusible material applied to an outside of an end of the seam.

2. The method according to claim 1, wherein the heat-sealing device takes the form of an ultrasonic heat-sealing device.

3. The method according to claim 1, wherein the fusible material is supplied in the form of a plastic film.

4. The method according to claims 1, wherein said plastic film is at least slightly wider than a width of the seam.

5. The method according to claim 1, wherein said at least one thread, which is used to produce the seam, is connected to the fabric on the upper side and on the underside of the seam.

6. The method according to one of claims 1, wherein said fusible material is a thermoplastic.

7. The method according to one of claim 6, wherein said fusible material is polyethylene.

8. A device for producing a seam reinforcement, the device comprising:
    an ultrasonic sonotrode;
    a functionally complementary subordinate tool, said ultrasonic sonotrode being capable of being displaced towards said functionally complementary subordinate tool with a section of fabric with a seam capable of being arranged between said ultrasonic sonotrode and said subordinate tool, whereby a seam-end comes to be situated between the effective surfaces of said ultrasonic sonotrode and said subordinate tool; and a feeding mechanism arranged in the device for supplying plastic film into the effective region between the ultrasonic sonotrode and subordinate tool, said plastic film being formed of a fusible material to connect a thread of the seam to the fabric.

9. The device according to claim 8, wherein said plastic film is at least slightly wider at right angles to the conveying direction than a width of said ultrasonic sonotrode.

10. The device according to claim 8, wherein said feeding mechanism comprises a first spool and a second spool which are rotatably supported and capable of being displaced together with the ultrasonic sonotrode, whereby a strip of film is capable of being stored on said first spool, said second spool is capable of being driven for conveying the strip of film, and said first spool and said second spool are connected by means of the strip of film in such a manner that the strip of film passes between said ultrasonic sonotrode and said subordinate tool.

11. The device according to one of claims 10, wherein after each heat-sealing operation the strip of film is conveyed by said second spool onward by one conveying width, which is at least slightly wider than the length of the ultrasonic sonotrode.

12. A method for producing a reinforced seam on a textile workpiece, comprising the steps of:

stitching the fabric with a thread to produce a seam portion;

applying a fusible material to the seam portion with a heat-sealing device to connect the thread to the fabric.

13. The method according to claim 12, wherein the heat-sealing device takes the form of an ultrasonic heat-sealing device and said fusible material is a thermoplastic.

14. The method according to claim 12, wherein the fusible material is supplied in the form of a plastic film and is only applied to an end of the seam portion.

15. The method according to claim 12, wherein said plastic film is at least slightly wider than a width of the seam portion.

16. The method according to claim 12, wherein the thread, which is used to produce the seam portion, is connected to the fabric on the upper side and on the underside of the seam.

17. The method according to one of claim 12, wherein said fusible material is polyethylene.

18. A method in accordance with claim 12, wherein:

said fusible material is applied to the seam portion after said stitching to produce said seam portion.

19. A method in accordance with claim 12, wherein:

said fusible material is applied to an outside of the seam portion.

20. A method in accordance with claim 12, wherein:

said fusible material is applied to opposite outer sides of the seam portion.

21. A device in accordance with claim 8, wherein:

said feeding mechanism supplies the plastic film between the seam and one of the ultrasonic sonotrode and the subordinate tool.

* * * * *